Patented May 1, 1951

2,550,745

UNITED STATES PATENT OFFICE 2,550,745

VINYL t-HYDROXY KETONES

Richard S. Wilder, Roslyn, and Daniel F. Herman, Philadelphia, Pa., assignors to Publicker Industries Inc., Philadelphia, Pa., a corporation of Pennsylvania No Drawing. Application April 10, 1947, Serial No. 740,728

19 Claims. (Cl. 260—594)

Our invention relates to novel chemical compounds and to a process for the preparation thereof. More particularly, it is concerned with new vinyl t-hydroxy ketones produced by the pyrolysis of the corresponding N-disubstituted amino t-hydroxy ketones, and to the involved process for the synthesis thereof.

While it is known that compounds of the type

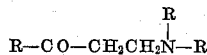

can be pyrolized to produce the corresponding unsaturated carbonyl compound and secondary amine, it is considered to be indeed surprising that N-disubstituted amino t-hydroxy ketones of the class described herein, and which contain a tertiary alcohol group, could be given similar treatment to split off the corresponding secondary amine without effecting simultaneous dehydration involving the aforesaid tertiary alcohol group, since it is well known that such alcohols lend themselves very readily to dehydration under relatively mild conditions, particularly when heated in the presence of an amine salt.

The new compositions of our invention are vinyl t-hydroxy ketones in which the keto and t-hydroxyl groups are one and two carbon atoms removed, respectively, from the vinyl group and include compounds represented by the following general formula:

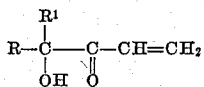

in which the substituents R and $R^1$ may represent either aralkyl, alkyl, or aryl and R and $R^1$ combined may constitute parts of a cycloaliphatic ring.

The new compounds of the present invention may be suitably prepared in excellent yields, i. e., 90% and above, by subjecting the corresponding N-disubstituted amino t-hydroxy ketone to pyrolytic conditions under reduced pressure, condensing the resulting vapors, collecting the distillate, and carefully fractionating the latter under reduced pressure to obtain the vinyl t-hydroxy ketone in substantially pure form.

In accordance with the present invention, the vinyl t-hydroxy ketones are preferably produced by first preparing the corresponding N-disubstituted amino t-hydroxy ketones. This synthesis involved condensing a suitable t-hydroxy ketone with formaldehyde and a secondary amine, or a salt thereof, as described in detail in our copending application, U. S. Serial No. 740,727, filed April 10, 1947. The N-disubstituted amino t-hydroxy ketone thus prepared is then converted to the corresponding vinyl t-hydroxy ketone by heating the reaction mixture containing the crude N-disubstituted amino t-hydroxy ketone. In connection with the foregoing it should be pointed out that it is not generally necessary to utilize equimolecular quantities of the secondary amine or its salt in effecting the reaction of our invention, since, during pyrolysis, the amine portion of the involved N-disubstituted amino t-hydroxy ketone is split off and as a result is free to react further with additional t-hydroxy ketone and formaldehyde to produce more N-disubstituted amino t-hydroxy ketone which is then in turn converted to the desired vinyl t-hydroxy ketone. Frequently to prevent excessive polymerization, we have found it desirable to introduce a suitable antioxidant into the reaction mixture, such as for example, hydroquinone, β-naphthylamine, trinitrobenzene, t-butylcatechol, or the like.

N-disubstituted amino t-hydroxy ketones for use in the present invention are those described in detail in the aforesaid copending application, U. S. Serial No. 740,727, and which may be generally illustrated by the following structural formula:

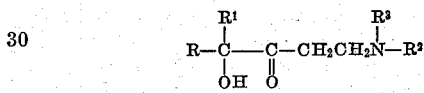

wherein the substituents R and $R^1$ may be either aralkyl, aryl, or alkyl, and R and $R^1$ combined may represent a completed cycloaliphatic ring in which the carbon atom holding the hydroxyl group is present; $R^2$ may be either alkyl or aryl; $R^3$ represents alkyl, and $R^2$ and $R^3$ combined complete morpholine or piperidine rings.

As specific examples of such N-disubstituted amino t-hydroxy ketones there may be mentioned 4-methyl-1-diethylaminopentan-4-ol-3-one, 4-methyl - 1 - dimethylaminopentan-4-ol-3-one, 4-methyl-1-diethylaminohexan-4-ol-3-one, 4,6 - dimethyl-1-diethylaminoheptan-4-ol-3-one, 4-ethyl-1-diethylaminohexan-4 - ol - 3 - one, 3-(1-hydroxycyclohexyl) - 1 - diethylaminopropan - 3-one, 4-methyl-1-diisopropylaminopentan-4-ol-3-one, 4 - methyl-1-morpholinopentan-4-ol-3-one, 4-methyl-1-piperdinopentan-4-ol-3-one, 4-methyl-1-dimethylaminohexan-4-ol-3-one, 4-methyl-1-(N-methylanilino) pentan-4-ol-3-one, and the like.

The monomer content of the crude reaction mixture may be readily determined by polymerizing a solution of the material in ethyl alcohol in the presence of benzoyl peroxide. The dissolved polymer is precipitated by pouring the ethyl alcohol solution into water after which the precipitate is thoroughly washed and dried at about 110° C. From the weight of the crude reaction mixture containing the monomer and the weight of dried polymer obtained the monomer content of the crude product can be ascertained and from that value the yield of vinyl t-hydroxy ketone can be calculated.

The present invention may be further illustrated by the following specific examples.

Example I

A mixture of 204 parts of 2-methylbutan-2-ol-3-one, 240 parts of diethylamine hydrochloride, and 66 parts of paraformaldehyde is heated with agitation in the presence of t-butylcatechol on a steam bath for a period of four hours. At the end of this reaction period a clear amber solution of the hydrochloride of 4-methyl-1-diethylaminopentan-4-ol-3-one is obtained. The resulting solution is next distilled under reduced pressure, the first stage of such distillation being carried out at a vapor temperature of about 50° C. and under a reduced pressure of 100 mm. After a small quantity of distillate is obtained under the aforesaid conditions of temperature and pressure, the temperature of the reaction mixture is gradually increased to 150° C. and the pressure is reduced to 25 mm., the major portion of the product distilling over at 80–90° C. Toward the end of the reaction, the reaction temperature is increased to 170–180° C. The crystalline residue remaining in the still, consists essentially of recovered diethylamine hydrochloride containing a small amount of tarry material. This residue can be reused without further treatment for a number of successive runs with no reduction in yield of product. On distillation of the crude fraction containing the principal portion of the 2-methyl-4-penten-2-ol-3-one thus obtained, it is found that the impurity present therein is, for the most part, water together with a small amount of unreacted 2-methylbutan-2-ol-3-one. The pure vinyl t-hydroxy ketone thus produced boils at 84–85° C./100 mm. and has a refractive index, $n_D^{20}$, of 1.4611. The 2-methyl-4-penten-2-ol-3-one thus produced is water white and is obtained in 90% yield.

*Analysis.*—Calculated carbon content for 2-methyl-4-penten-2-ol-3-one, 63.15%; found, 63.02%. Calculated hydrogen content, 8.77%; found, 8.91%.

The example which follows shows that it is possible to produce the vinyl t-hydroxy ketones of our invention by utilizing the secondary amine component in an amount less than that theoretically required to enter into the condensation, since the amine salt liberated in the pyrolysis of the condensation product is free to react further with the saturated t-hydroxy ketone present to form more of said condensation product.

Example II

A mixture of 230 parts of 2-methylbutan-2-ol-3-one, 67.5 parts of paraformaldehyde and 115.5 parts of diethylamine hydrochloride is digested on a steam bath for three hours. The mixture is next heated to 155° C. under 100 mm. pressure and the vinyl t-hydroxy ketone thus formed is distilled at a vapor temperature of 115° C. The pressure is gradually reduced to 50 mm., and thereafter a total of 260.5 parts of crude product is secured. This product is redistilled in an efficient fractionating column to obtain the 2-methyl-4-penten-2-ol-3-one in 63% yield based on 2-methylbutan-2-ol-3-one. The yield in this instance is low because distillation has to be interrupted after about two-thirds of the crude fraction has been distilled owing to polymer formation in the distillation column. However, for each 1.35 moles produced only 1 mole of diethylamine hydrochloride is required.

Example III

A mixture of 116 parts of 3-methylpentan-3-ol-2-one, 121 parts of diethylamine hydrochloride, and 33 parts of paraformaldehyde is heated on a steam bath for five hours. After this reaction period the product is heated under reduced pressure to decompose the amine as described in the foregoing examples and the vinyl t-hydroxy ketone formed is distilled off at 25 mm. The product thus obtained is redistilled and substantially pure 4-methyl-1-hexen-4-ol-3-one, boiling at 88–89° C./50 mm. is obtained and amounts to 96.5 parts. The refractive index and specific density, respectively, are as follows: $n_D^{20}$, 1.4420; $d_4^{20}$, 0.955.

*Analysis.*—Calculated carbon content of 4-methyl-1-hexan-4-ol-3-one, 65.6%; found 65.24%. Calculated hydrogen content, 9.37%; found, 9.51%.

Example IV

A mixture of 144 parts of 3,5-dimethylhexan-3-ol-2-one, 121 parts of diethylamine hydrochloride, and 33 parts of paraformaldehyde is heated on a steam bath for five hours after which the reaction mixture is subjected to pyrolysis at 150° C. under 5 mm. pressure whereupon 116.5 parts of the crude vinyl t-hydroxy ketone is obtained. Refractionation of this product yields 64.3 parts of 4,6-dimethyl-1-hepten-4-ol-3-one, boiling at 108–113° C./60 mm. An additional 41.9 parts of crude product is obtained from a head and tail cut. The fraction boiling at 108–113° C./60 mm. has the following refractive index and specific gravity: $n_D^{20}$, 1.4406; $d_4^{20}$, 0.917.

*Analysis.*—Calculated carbon content of 4,6-dimethyl-1-hepten-4-ol-3-one, 69.23%; found, 68.67%. Calculated hydrogen content, 10.24%; found, 10.55%.

While, as already described, we prefer to pyrolyze the salts of the N-disubstituted amino t-hydroxy ketone, we have found that it is possible to pyrolyze the free base and obtain the vinyl t-hydroxy ketone as shown by the following example:

Example V

One hundred parts of 4-methyl-1-diethylaminopentan-4-ol-3-one is heated at 160–175° under reduced pressure of 100 mm. of mercury. Within one-half hour 43 parts of distillate is obtained, coming off in the range of 85–100° C. Four parts of additional material is obtained in a cold trap. Polarographic analysis of the distillate shows it to contain 9.5 parts of methylpentenelone. The remainder of the distillate consists of diethylamine and some unconverted 4-methyl-1-diethylaminopentan-4-ol-3-one.

The lower molecular weight vinyl t-hydroxy ketones of the present invention are generally water soluble and all of these substances are lachrymatory compounds, relatively stable to light, and are ordinarily soluble in the lower aliphatic alcohols. On extended exposure to sunlight and/or heat, however, they generally polymerize to yield white, tacky, water insoluble polymers.

The new compounds of this invention may be utilized in the preparation of ingredients of film forming compositions and may likewise be employed in the synthesis of other valuable compounds and compositions.

It is to be understood, of course, that the above examples are merely illustrative and that our invention is not limited to the particular vinyl t-hydroxy ketones described therein, nor to the particular procedures employed. Our invention includes the entire class of vinyl t-hydroxy ketones as previously defined and as set forth in the appended claims. From the present disclosure it will be recognized that the pyrolysis reaction here involved is very general in nature and hence, it is to be understood that the present invention contemplates the production of any vinyl t-hydroxy ketone of the aforesaid class by the pyrolysis of the corresponding N-disubstituted amino t-hydroxy ketone, i. e., the free amine or the amine salt. In general, it may be said that the use of any equivalents or modifications of procedure that would naturally occur to one skilled in the art is included within the scope of our invention.

What we claim is:

1. Vinyl t-hydroxy ketones wherein the keto and t-hydroxyl groups are one and two carbon atoms removed, respectively, from the vinyl group, said ketones having the general formula:

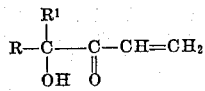

wherein the constituents R and $R^1$ are members selected from the group consisting of aralkyl, aryl and alkyl, and R and $R^1$ combined may represent a completed cycloaliphatic ring in which the carbon atom holding the hydroxyl group is present.

2. 2-methyl-4-penten-2-ol-3-one.
3. 4-methyl-1-hexen-4-ol-3-one.
4. 4,6-dimethyl-1-hepten-4-ol-3-one.

5. In a process for the synthesis of 2-methyl-4-penten-2-ol-3-one, the step which comprises subjecting 4-methyl-1-diethylaminopentan-4-ol-3-one to pyrolysis at a temperature not in substantial excess of 200° C. and at reduced pressure.

6. In a process for the synthesis of 4-methyl-1-hexen-4-ol-3-one the step which comprises subjecting 4-methyl-1-diethylaminohexan-4-ol-3-one to pyrolysis at a temperature not in substantial excess of 200° C. and at reduced pressure.

7. In a process for the synthesis of 4,6-dimethyl-1-hepten-4-ol-3-one the step which comprises subjecting 4,6-dimethyl-1-diethylaminoheptan-4-ol-3-one to pyrolysis at a temperature not in substantial excess of 200° C. and at reduced pressure.

8. In a process for the synthesis of vinyl t-hydroxy ketones in which the keto and t-hydroxyl groups are one and two carbons atoms removed, respectively, from the vinyl group, the step which comprises subjecting to pyrolysis, at a temperature not above about 200° C. and at subatmospheric pressure, an N-disubstituted amino-t-hydroxy ketone of the general formula:

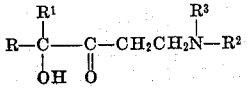

wherein the substituents R and $R^1$ are members selected from the group consisting of aralkyl, aryl, and alkyl, and R and $R^1$ combined represent a completed cycloaliphatic ring in which the carbon atom holding the hydroxyl group is present; $R^2$ is a member selected from the group consisting of alkyl and aryl; $R^3$ is alkyl; and $R^2$ and $R^3$ combined complete a cyclic radical selected from the group consisting of morpholine and piperidine rings.

9. In a process for the synthesis of vinyl t-hydroxy ketones in which the keto and t-hydroxyl groups are one and two carbon atoms removed, respectively, from the vinyl group, the step which comprises subjecting to pyrolysis, at a temperature of from about 50° C. to about 200° C. and at subatmospheric pressure, an N-disbustituted amino-t-hydroxy ketone of the general formula:

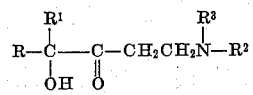

wherein the substituents R and $R^1$ are members selected from the group consisting of aralkyl, aryl, and alkyl, and R and $R^1$ combined represent a completed cycloaliphatic ring in which the carbon atom holding the hydroxyl group is present; $R^2$ is a member selected from the group consisting of alkyl and aryl; $R^3$ is alkyl; and $R^2$ and $R^3$ combined complete a cyclic radical selected from the group consisting of morpholine and piperidine rings.

10. In a process for the synthesis of vinyl t-hydroxy ketones in which the keto and t-hydroxyl group are one and two carbon atoms removed, respectively, from the vinyl group, the step which comprises subjecting to pyrolysis, at a temperature of from about 50° C. to about 180° C. and at a pressure of between about 5 and 100 mm., an N-disubstituted amino-t-hydroxy ketone of the general formula:

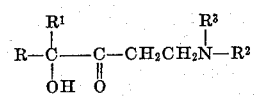

wherein the substituents R and $R^1$ are members selected from the group consisting of aralkyl, aryl, and alkyl, and R and $R^1$ combined represent a completed cycloaliphatic ring in which the carbon atom holding the hydroxyl group is present; $R^2$ is a member selected from the group consisting of alkyl and aryl; $R^3$ is alkyl; and $R^2$ and $R^3$ combined complete a cyclic radical selected from the group consisting of morpholine and piperidine rings.

11. In a process for the synthesis of vinyl t-hydroxy ketones in which the keto and t-hydroxyl groups are one and two carbons atoms removed, respectively, from the vinyl group, the step which comprises subjecting to pyrolysis, at a temperature of about 150° C. and at a pressure of between about 50 and 100 mm., an N-disubstituted amino-t-hydroxy ketone of the general formula:

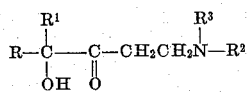

wherein the substituents R and $R^1$ are members selected from the group consisting of aralkyl, aryl, and alkyl, and R and $R^1$ combined represent a completed cycloaliphatic ring in which the carbon atom holding the hydroxyl group is present; $R^2$ is a member selected from the group consisting of alkyl and aryl; R³ is alkyl; and R² and R³ combined complete a cyclic radical selected from the group consisting of morpholine and piperidine rings.

12. A process for the synthesis of vinyl t-hydroxy ketones in which the keto and t-hydroxyl groups are one and two carbon atoms removed, respectively, from the vinyl group, which comprises mixing a t-hydroxy methyl ketone, in which the t-hydroxyl group is attached to a carbon atom adjacent to the carbonyl group, with formaldehyde and a secondary amine salt and heating the mixture at reduced pressure and at a temperature of about 50–180° C., thereby simultaneously to effect condensation producing an N-disubstituted amino t-hydroxy ketone having the following general structural formula:

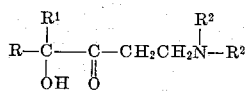

wherein the substituents R and R¹ are members selected from the group consisting of aralkyl, aryl, and alkyl, and R and R¹ combined may represent a completed cycloaliphatic ring in which the carbon atom holding the hydroxyl group is present; R² is a member selected from the group consisting of alkyl and aryl; R³ is alkyl; and R² and R³ combined complete a cyclic radical selected from the group consisting of morpholine and piperidine rings, and to effect pyrolysis of the condensation product, the secondary amine salt being present in an amount substantially less than that theoretically required to enter into the condensation; the difference being made up by secondary amine salt liberated as a result of the simultaneous pyrolysis of the condensation product.

13. A process for the synthesis of 2-methyl-4-penten-2-ol-3-one which comprises mixing 2-methylbutan-2-ol-3-one with formaldehyde and diethylamine hydrochloride and heating the mixture at reduced pressure and at a temperature of about 50–180° C. thereby simultaneously to effect condensation producing 4-methyl-1-diethylaminopentan-4-ol-3-one and to effect pyrolysis of the condensation product, the diethylamine hydrochloride being present in an amount substantially less than that theoretically required to enter into the condensation; the difference being made up by diethylamine hydrochloride liberated as a result of the simultaneous pyrolysis of the condensation product.

14. A process for the synthesis of 4-methyl-1-hexen-4-ol-3-one which comprises mixing 3-methylpentan-3-ol-2-one with formaldehyde and diethylamine hydrochloride and heating the mixture at reduced pressure and at a temperature of about 50–180° C. thereby simultaneously to effect condensation producing 4-methyl-1-diethylaminohexan-4-ol-3-one and to effect pyrolysis of the condensation product, the diethylamine hydrochloride being present in an amount substantially less than that theoretically required to enter into the condensation; the difference being made up by diethylamine hydrochloride liberated as a result of the simultaneous pyrolysis of the condensation product.

15. A process for the synthesis of 4,6-dimethyl-1-hepten-4-ol-3-one which comprises mixing 3,5-dimethylhexan-3-ol-2-one with formaldehyde and diethylamine hydrochloride and heating the mixture at reduced pressure and at a temperature of about 50–180° C. thereby simultaneously to effect condensation producing 4,6-dimethyl-1-diethylaminoheptan-4-ol-3-one and to effect pyrolysis of the condensation product, the diethylamine hydrochloride being present in an amount substantially less than that theoretically required to enter into the condensation; the difference being made up by diethylamine hydrochloride liberated as a result of the simultaneous pyrolysis of the condensation product.

16. In a process for the synthesis of vinyl t-hydroxy ketones in which the keto and t-hydroxyl groups are one and two carbon atoms removed, respectively, from the vinyl group, the step which comprises heating at subatmospheric pressure an N-disubstituted amino t-hydroxy ketone of the general structural formula:

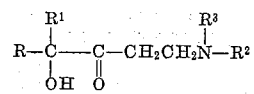

wherein the substituents R and R¹ are members selected from the group consisting of aralkyl, aryl, and alkyl, and R and R¹ combined represent a completed cycloaliphatic ring in which the carbon atom holding the hydroxyl group is present; R² is a member selected from the group consisting of alkyl and aryl; R³ is alkyl; and R² and R³ combined complete a cyclic radical selected from the group consisting of morpholine and piperidine rings.

17. In a process for the synthesis of vinyl t-hydroxy ketones in which the keto and t-hydroxyl groups are one and two carbon atoms removed, respectively, from the vinyl group, the steps which comprise condensing a t-hydroxy methyl ketone, in which the t-hydroxyl group is attached to a carbon atom adjacent to the carbonyl group, with formaldehyde and a secondary amine to produce an N-disubstituted amino t-hydroxy ketone having the following general structural formula:

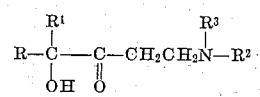

wherein the substituents R and R¹ are members selected from the group consisting of aralkyl, aryl, and alkyl, and R and R¹ combined represent a completed cycloaliphatic ring in which the carbon atom holding the hydroxyl group is present; R² is a member selected from the group consisting of alkyl and aryl; R³ is alkyl; and R² and R³ combined complete a cyclic radical selected from the group consisting of morpholine and piperidine rings, and subjecting said N-disubstituted amino t-hydroxy ketone to pyrolysis at reduced pressure and at a temperature not in substantial excess of 200° C.

18. In a process for the synthesis of vinyl t-hydroxy ketones in which the keto and t-hydroxyl groups are one and two carbon atoms removed, respectively, from the vinyl group, the steps which comprise condensing a t-hydroxy methyl ketone, in which the t-hydroxyl group is attached to a carbon atoms adjacent to the carbonyl group, with formaldehyde and a secondary amine salt to produce an N disubstituted amino t-hydroxy ketone having the following general structural formula:

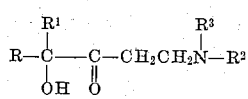

wherein the substituents R and R¹ are members selected from the group consisting of aralkyl, aryl, and alkyl, and R and R¹ combined represent a completed cycloaliphatic ring in which the carbon atom holding the hydroxyl group is present; $R^2$ is a member selected from the group consisting of alkyl and aryl; $R^3$ is alkyl; and $R^2$ and $R^3$ combined complete a cyclic radical selected from the group consisting of morpholine and piperidine rings, and subjecting said N-disubstituted amino t-hydroxy ketone to pyrolysis at reduced pressure and at a temperature not in substantial excess of 200° C.

19. In a process for the synthesis of vinyl t-hydroxy ketones in which the keto and t-hydroxyl groups are one and two carbon atoms removed, respectively, from the vinyl group, the steps which comprise condensing a t-hydroxy methyl ketone, in which the t-hydroxyl group is attached to a carbon atom adjacent to the carbonyl group, with formaldehyde and a secondary amine salt to produce an N-disubstituted amino t-hydroxy ketone having the following general structural formula:

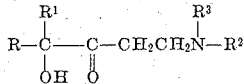

wherein the substituents R and R¹ are members selected from the group consisting of aralkyl, aryl, and alkyl, and R and R¹ combined represent a completed cycloaliphatic ring in which the carbon atom holding the hydroxyl group is present; $R^2$ is a member selected from the group consisting of alkyl and aryl; $R^3$ is alkyl; and $R^2$ and $R^3$ combined complete a cyclic radical selected from the group consisting of morpholine and piperidine rings, and subjecting said N-disubstituted amino t-hydroxy ketone to pyrolysis at reduced pressure and at a temperature of from about 50° to 180° C. and at a pressure of between about 5 and 100 mm.

RICHARD S. WILDER.
DANIEL F. HERMAN.

REFERENCES CITED

The following references are of record in the file of this patent:

UNITED STATES PATENTS

| Number | Name | Date |
|---|---|---|
| 2,101,314 | Grun | Dec. 7, 1937 |

OTHER REFERENCES

Lozach: Bull. soc. chim., vol. 11, pages 416–420 (1944), abstracted in Chemical Abstracts, vol. 40, 2114 (1946).

Wittig et al.: Berichte, vol. 76, pages 109–120 (1943).

Scheibler et al.: Berichte, vol. 55B, pages 2903–2923 (1922).

Adams et al.: "Organic Reactions," vol. I, pages 304, 307, 308, 318, and 322, published 1942 by John Wiley & Sons, Inc., New York.